UNITED STATES PATENT OFFICE.

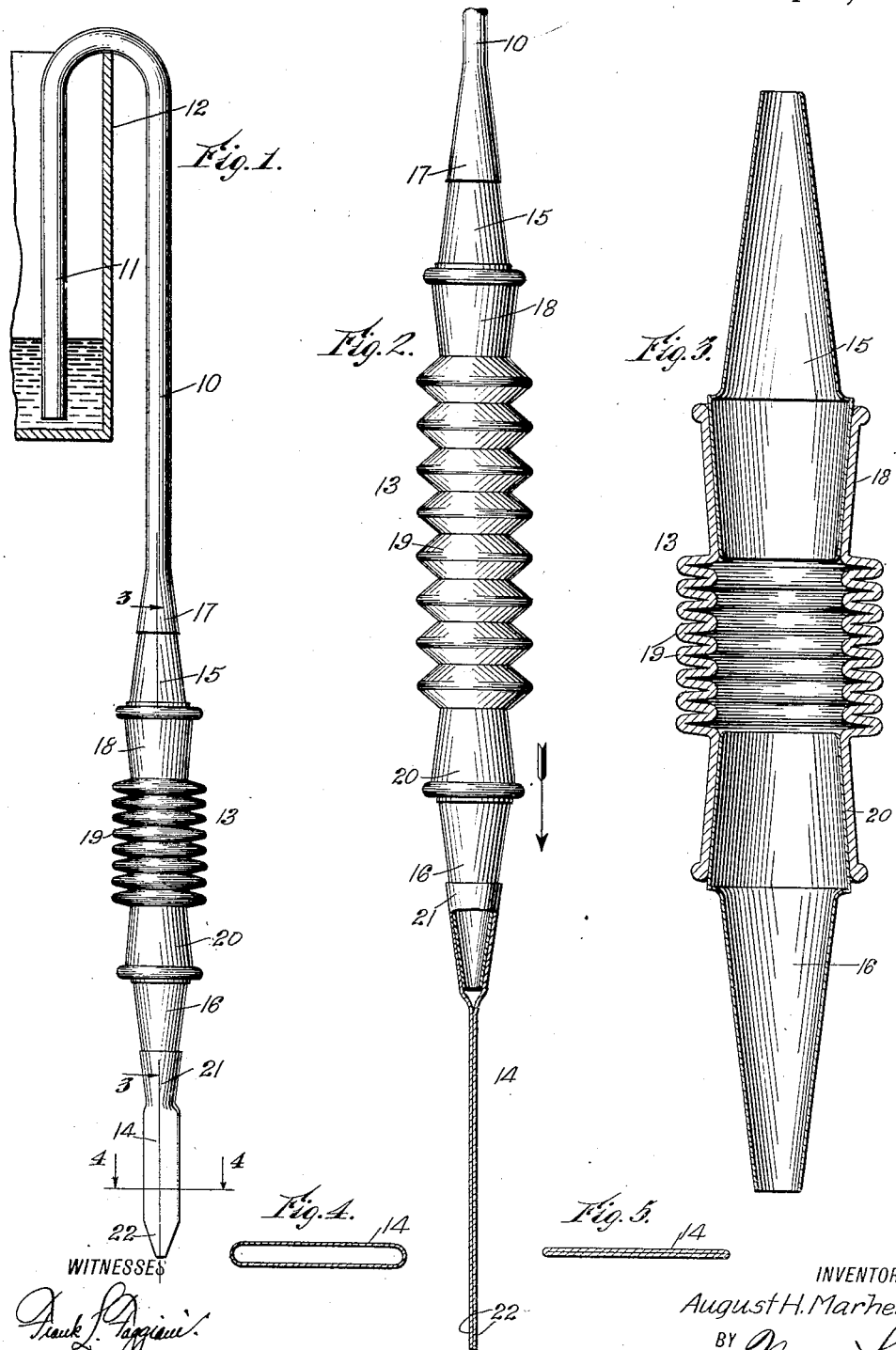

AUGUST H. MARHENKE, OF NEW YORK, N. Y.

SIPHON-STARTER.

1,336,310.  Specification of Letters Patent.  Patented Apr. 6, 1920.

Application filed June 3, 1918. Serial No. 237,984.

*To all whom it may concern:*

Be it known that I, AUGUST H. MAR-HENKE, a citizen of the United States, and a resident of the city of New York, borough of Manhattan, in the county and State of New York, have invented a new and Improved Siphon-Starter, of which the following is a full, clear, and exact description.

This invention relates to fluid transferring devices or conveyers, and has particular reference to means to initiate the action of a siphon for delivering a liquid from a vessel.

Among the objects of the invention is to provide a means to start a siphon so as to empty a part or all of the contents of a tank that is located in an elevated position or otherwise difficult of access for starting a siphon by any ordinary means.

More specifically stated I provide a siphon or means for starting a siphon adapted especially for the emptying of the stale water from an aquarium located at an overhead position, the improvement being such that the short leg of the siphon may be projected directly into the water and then by a simple manipulation of the siphon starter the water will be carried up the short leg and over the bend sufficiently filling the siphon to initiate the flow of the water from the tank or container.

In the usual practice of a siphon for emptying the stale water from an aquarium it is necessary for the operator to apply the longer leg of the siphon to his mouth to draw the water into the siphon, but obviously this practice is unsanitary and otherwise objectionable. I wish it to be understood furthermore that while I refer herein to the use of the device as a means for emptying the stale water from an aquarium the use of the improvement is not to be unnecessarily limited to any particular field of operation since the use may be as extensive as that of a siphon for the transferring of liquid from one container to another or for emptying a container of liquid.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a side elevation of my improvement with one leg of the siphon introduced into an elevated fluid container.

Fig. 2 is a side elevation of the improved starter indicating the automatic valve attached thereto in section and in the position assumed thereby when the starter is extended.

Fig. 3 is a vertical sectional view of the body portion of the improvement on the line 3—3 of Fig. 1.

Fig. 4 is a transverse sectional detail on the line 4—4 of Fig. 1; and

Fig. 5 is a view of the same but indicating the collapsed position of the automatic valve as in Fig. 2.

Referring now more particularly to the drawings, I show a well known form of siphon having longer and shorter legs 10 and 11, the latter being indicated as projecting into a body of liquid in an elevated container 12.

My improvement comprises two principal parts, namely, the body 13 shown in detail in Fig. 3, and the automatic valve 14 carried by the lower end of the body.

The body 13 comprises two rigid tubular members or nipples 15 and 16 which may be of the same form and construction and each comprising a frusto-conical end for frictional engagement with the flexible or tapered end of the part to be attached thereto. The upper nipple 15 has air tight connection at 17 with the lower end of the longer leg 10 of the siphon. The lower end of the nipple 15 has fitted thereon frictionally the neck portion of the rubber body having corrugations or convolutions 19 and having at its lower end a neck 20 fitted upon the upper end of the nipple 16.

The automatic valve 14 comprises a coupling end 21 fitted upon the lower end of the nipple 16 while the lower end of the valve consists of two thin flexible lips 22. In the molding of the rubber valve 14 it is caused to assume normally the form indicated in Fig. 4 in cross section so that the two lips 22 lie in close parallel planes as do also the side members of all of the valve below the nipple 16.

The normal form of the body is indicated in Figs. 1 and 3, the corrugated portion 19 thereof having an inherent tendency to contract or collapse. The structure though is flexible and is adapted to be extended as indicated in Fig. 2 when the operator grasps the lower end 20 thereof and draws it downward as indicated by the arrow. If the siphon tube is rigid this extending movement may be effected with one hand alone, but if the siphon tube is flexible and is subject to collapse in engagement with the edge of the receptacle or container 12 the operator may use both hands, applying one at each end of the body 13.

With the shorter leg of the siphon projected into the fluid as illustrated in Fig. 1 the operator upon grasping the lower end of the rubber body 19 and drawing it downward with a relatively quick movement will cause the collapse of the thin flexible valve as shown in Figs. 2 and 5. The continued downward movement of the lower end of the body or extension of the flexible body will cause the water to rise in the shorter leg and flow out of the siphon. A single movement of this nature is sufficient ordinarily unless the siphon legs are unusually long, in which event several reciprocations of the lower end of the body 19 may be required, but in any event the movement is very easy requiring no effort or skill on the part of the operator. The valve 14 is automatic in its collapsing or closing action and after the fluid flows over the top of the siphon the valve will obviously open automatically to discharge the fluid downward therethrough into any previously arranged receptacle for this purpose.

I claim:

1. A siphon starter, comprising a pliable body enlarged and corrugated intermediate of its ends, said body having an inherent tendency to contract, being normally contracted and adapted to be extended in the direction of its length, and a normally open valve carried by the body and adapted to be closed when the body is extended.

2. A siphon starter, comprising a corrugated rubber body, said body having an inherent tendency to contract and adapted to be extended longitudinally, and a flattened tubular flexible valve member carried by the body and adapted to be collapsed when the body is extended.

3. A siphon starter comprising a rubber body enlarged and corrugated a short distance from each end forming reduced necks at the ends, nipples in the necks, the nipple at one end being adapted to enter the long leg of a siphon tube, and a flexible flattened tubular valve member on the other nipple.

AUGUST H. MARHENKE.